Patented Sept. 2, 1930

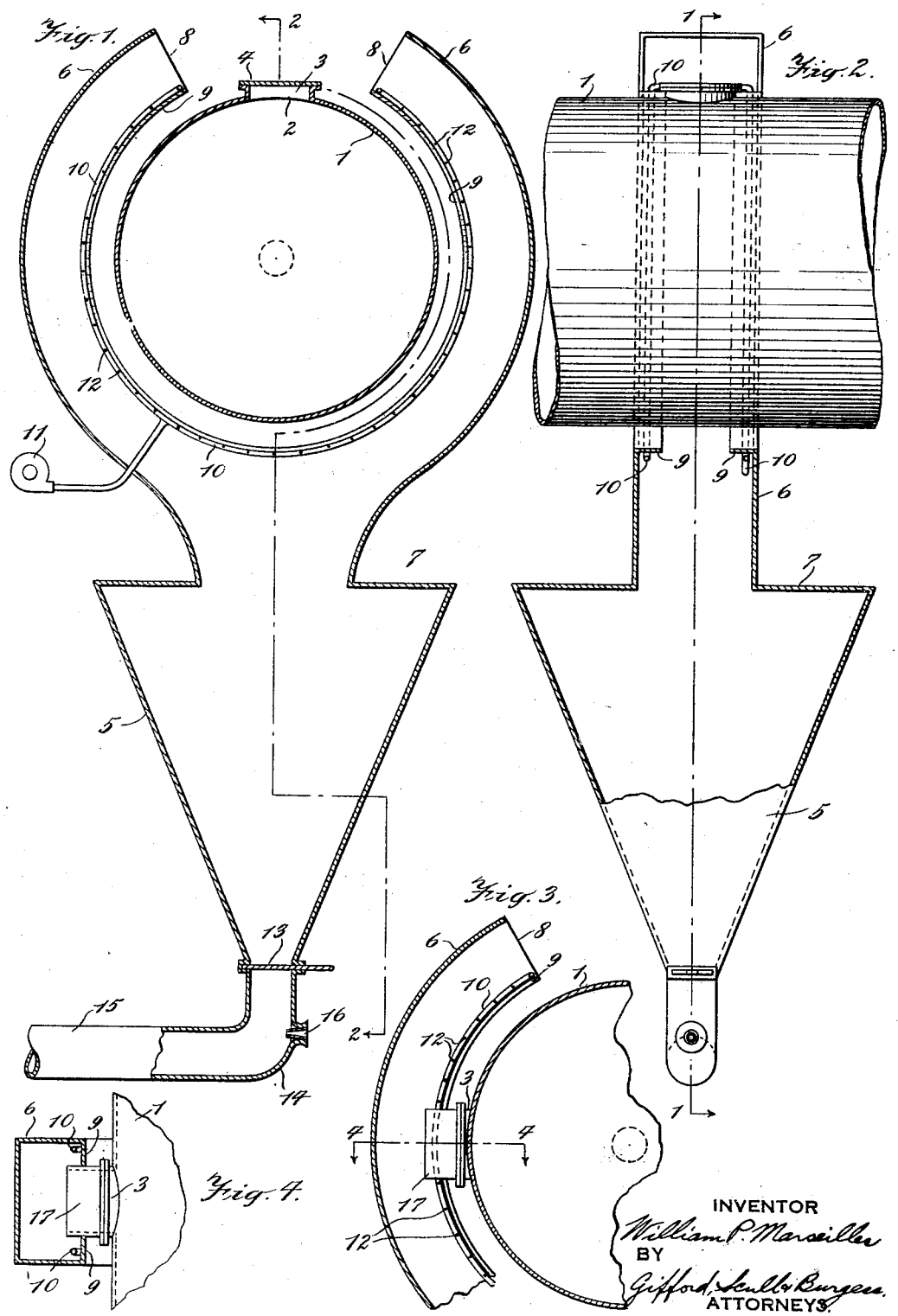

1,774,757

UNITED STATES PATENT OFFICE

WILLIAM P. MARSEILLES, OF NEW YORK, N. Y., ASSIGNOR TO SOLVENTS EXTRACTION CORPORATION, OF NEW YORK, N. Y., A CORPORATION OF NEW YORK

DUST COLLECTOR

Application filed July 3, 1929. Serial No. 375,614.

This invention relates to a novel and improved form of collector, particularly adapted to prevent scattering of dust during the emptying of a drum used as a dryer or extractor. The invention will be best understood from the following description and the annexed drawing, in which I have shown a selected embodiment of the invention and in which;

Fig. 1 is a vertical sectional view through a drum and collector constructed according to the invention, and taken on the line 1—1 of Fig. 2.

Fig. 2 is a view on the line 2—2 of Fig. 1.

Fig. 3 is a fragmentary section corresponding to Fig. 1 but showing parts in a different position and with the nozzle in place.

Fig. 4 is a section on the line 4—4 of Fig. 3.

In industries which employ drums for the purpose of drying material or for other purposes, it is necessary at intervals to dump the material from the drum and this dumping is usually the cause of the formation of large clouds of dust which materially interferes with the resumption of operations. With certain kinds of material, it is often impossible for workmen to breathe the dust for an extended period after the dumping has taken place.

In the illustrated embodiment of the invention, the above trouble is obviated. I have shown a drum 1 which it will be understood may be a dryer or extractor, and which is provided with an opening 2 surrounded by a flanged wall 3. The opening is usually closed by any suitable cover 4, as shown in Fig. 1.

Beneath the drum is provided a hopper 5, this hopper being in such a position that when the drum is rotated the material therein may be dumped through the opening 2 into the hopper, it being understood that the drum is rotatably mounted in any suitable manner. Extending upwardly from the hopper is a hood 6, this hood being integrally connected to the top 7 of the hopper, so as to form therewith a continuous surface surrounding the drum on both sides thereof, except for a short distance at the top over the opening 2. The upper ends of the hood, as shown at 8, may be left open, and the hood is provided with inwardly extending flanges 9, as best shown in Figs. 2 and 4, these flanges being approximately parallel to the circumference of the drum. Disposed in the hood are pipes 10 connected to a fan 11, and these pipes are provided with openings 12 so that upon operation of the fan, dust in the hood may be drawn away from the open ends 8. The suction is preferably sufficient to give the dust a downward movement towards the hopper.

At the bottom of the hopper is a suitable valve 13, and the bottom of the hopper is connected by an elbow 14 to a pneumatic tube 15, and in the elbow is placed an air inlet 16 through which air from any suitable source may be discharged into the tube, thereby drawing dust from the hopper and forcing it along the tube.

In operation, the cover 4 will be removed and replaced by a nozzle 17 shown as having flanges by means of which it may be connected to the flanges on the wall 3. It will be noted that this nozzle extends between the flanges 9 on the hood and fits in the opening between these flanges with a working fit. The fan 11 is started in operation to create a downward suction away from the open ends 8, and then the drum is rotated in one direction or the other, the nozzle 17 entering between the flanges 9 at one of the open ends of the hood. Rotation of the drum continues until the material therein has been dumped into the hopper, and during this time it will be seen that the discharge of dust-laden material is always into a substantially closed receptacle. While this receptacle has openings at the ends 8 and between the flanges 9, nevertheless the suction exerted in the pipes 10 will create a downward draft to cause a flow of the dust downwardly into the hopper, it being noted that the fan 11 is connected to the pipes 10 near the lowest part thereof.

The valve 13 may be regulated, so as to provide the proper sized opening to cooperate with the air inlet 16 to the best advantage for propelling the dust through the tube 15, and for drawing it out of the hopper.

I claim:—

1. In combination, a rotary drum having an opening in the wall thereof, a hood extending around the drum at said opening, a hopper connected to said hood, and a nozzle adapted to be connected to the drum in line with said opening, the outer end of said nozzle being received within said hood when the drum is rotated to dump the contents thereof into said hopper.

2. In combination, a rotary drum having an opening in the wall thereof, a hood extending around the drum at said opening, a hopper connected to said hood, a nozzle adapted to be connected to the drum in line with said opening, the outer end of said nozzle being received within said hood when the drum is rotated to dump the contents thereof into said hopper, and means to convey said contents away from the hopper.

3. In combination, a rotary drum having an opening in the wall thereof, a hood extending around the drum at said opening, a hopper connected to said hood, a nozzle adapted to be connected to the drum in line with said opening, the outer end of said nozzle being received within said hood when the drum is rotated to dump the contents thereof into said hopper, and means to produce a suction in said hood to draw dust towards the hopper.

4. In combination, a rotary drum having an opening in the wall thereof, a hood extending around the drum at said opening, a hopper connected to said hood, a nozzle adapted to be connected to the drum in line with said opening, the outer end of said nozzle being received within said hood when the drum is rotated to dump the contents thereof into said hopper, a pneumatic tube connected to the bottom of said hopper, and means to discharge air into said tube to propel said contents along it.

5. In combination, a rotary drum having an opening in the wall thereof, a hood extending around the drum at said opening, a hopper connected to said hood, a nozzle adapted to be connected to the drum in line with said opening, the outer end of said nozzle being received within said hood when the drum is rotated to dump the contents thereof into said hopper, a pneumatic tube connected to the bottom of said hopper, and means to discharge air into said tube to propel said contents along it, said means being also adapted to draw the contents out of the hopper into the tube.

6. In combination, a rotary drum having an opening in the wall thereof, a hood extending around the drum at said opening, a hopper connected to said hood, a nozzle adapted to be connected to the drum in line with said opening, the outer end of said nozzle being received within said hood when the drum is rotated to dump the contents thereof into said hopper, a valve at the bottom of the hopper, a pneumatic tube connected to the hopper by an elbow, and means to discharge air into said tube at said elbow.

WILLIAM P. MARSEILLES.